United States Patent
Everingham

(10) Patent No.: US 8,949,326 B1
(45) Date of Patent: Feb. 3, 2015

(54) ROUTING WORK TO RESOURCES IN A WEB-BASED SOCIAL NETWORK

(75) Inventor: James Everingham, San Francisco, CA (US)

(73) Assignee: LiveOps, Inc., Redwood City, CA (US)

( * ) Notice: Subject to any disclaimer, the term of this patent is extended or adjusted under 35 U.S.C. 154(b) by 1937 days.

(21) Appl. No.: 12/004,854

(22) Filed: Dec. 21, 2007

(51) Int. Cl.
   *G06F 15/16* (2006.01)
(52) U.S. Cl.
   USPC ............ 709/204; 709/205; 709/206
(58) Field of Classification Search
   USPC .......................... 709/226, 201, 203
   See application file for complete search history.

(56) References Cited

U.S. PATENT DOCUMENTS

| | | | |
|---|---|---|---|
| 2002/0120744 A1* | 8/2002 | Chellis et al. | 709/226 |
| 2007/0208711 A1* | 9/2007 | Rhoads et al. | 707/3 |
| 2007/0299795 A1* | 12/2007 | Macbeth et al. | 706/16 |

OTHER PUBLICATIONS

U.S. Appl. No. 10/886,333, Jun. 5, 2008, Everingham et al., Notice of Allowance.

* cited by examiner

*Primary Examiner* — Djenane Bayard
(74) *Attorney, Agent, or Firm* — Duane Morris LLP; David T. Xue

(57) ABSTRACT

An exemplary method for routing work to resources in a web-based social network comprises determining a type of work in a work request from a service, determining at least one relevant capability for servicing the work request based on the type of work, determining, from a plurality of social networks, at least one resource in a social network having the relevant capability, and enabling the service to route work related to the work request to the at least one resource.

21 Claims, 5 Drawing Sheets

ROUTING WORK TO RESOURCES IN A WEB-BASED SOCIAL NETWORK

BACKGROUND

A social network is a network comprising nodes that are associated with each other by one or more relations. The nodes may be individuals or organizations. Exemplary relations include, without limitation, professions, web links, interests, activities, membership to organizations, and any other type of relations. A large number of people can be self-organized into multiple social networks based on one or more relations. Most social networks are web-based and provide a collection of various ways for nodes to interact, such as messaging, email, video, voice chat, file sharing, blogging, and discussion groups. These web-based social networks can be tapped for routing work to specific nodes (i.e., individuals or organizations) within the networks to optimally service any type of digitally packetized work.

Thus, it would be beneficial to provide a method and system to route work from services to resources in a web-based social network.

SUMMARY

An exemplary method for routing work to resources in a web-based social network comprises determining a type of work in a work request from a service, determining at least one relevant capability for servicing the work request based on the type of work, determining, from a plurality of social networks, at least one resource in a social network having the relevant capability, and enabling the service to route work related to the work request to the at least one resource.

Other exemplary embodiments and implementations are disclosed herein.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

I. Overview

Section II describes exemplary systems for routing work to resources in a social network.

Section III describes exemplary processes for routing work to resources in a social network.

Section IV describes an exemplary implementation of work routing in a call center scenario.

Section V describes an exemplary computing environment.

II. Exemplary Systems for Routing Work to Resources in a Social Network

Figure 1:
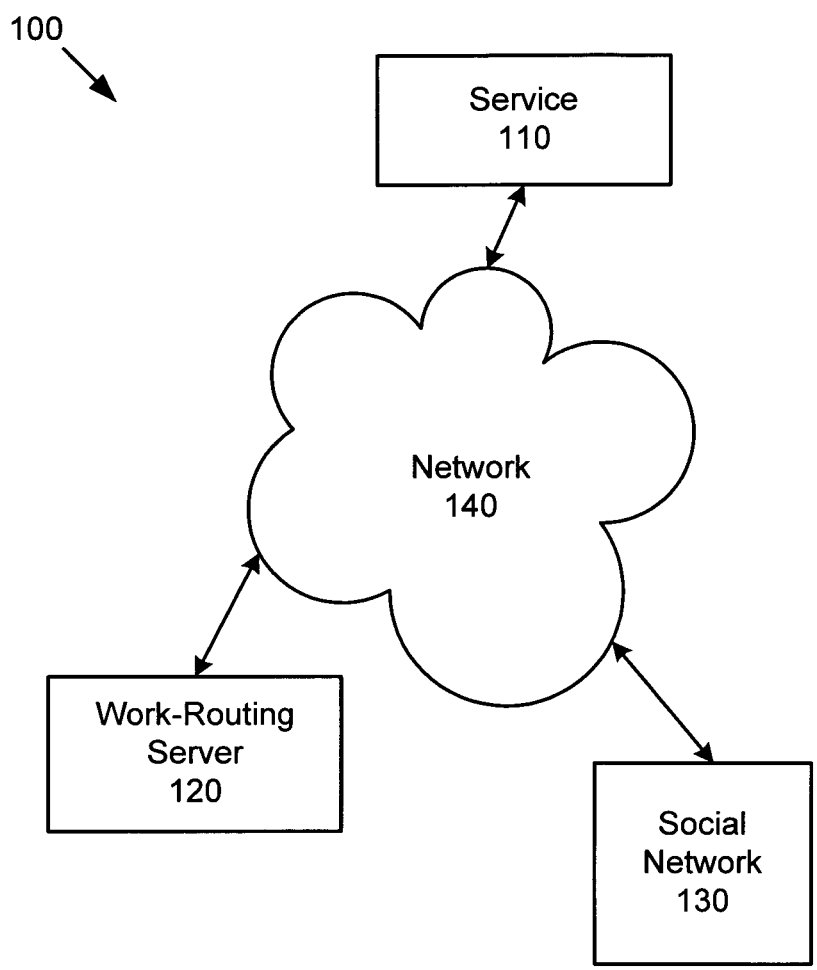
FIG. 1 illustrates an exemplary system for routing work to a social network.

FIG. 1 illustrates an exemplary system 100 for routing work to resources in a social network. The exemplary system 100 includes a service 110, a work-routing server 120, and a social network 130 connected to each other by a network 140. The network may be any communication network, for example, the Internet. The service 110 represents one or more individuals or organizations seeking resources to perform certain work. The work may be described in a work request which can be digitally packetized. For example, the work request may include a description of the work and any relevant metadata containing information related to the work. A service 110 seeking a resource to perform work may send a work request to the work-routing server 120 via the network 140. The work-routing server 120 selects a resource from the social network 130 and enables the routing of the work to the resource.

The social network 130 is a network of people who have self organized into a plurality of communities (or sub-networks). These communities may be referred to as a plurality of social networks. For ease of explanation, the term social network will be used in this patent to refer to a social network, multiple distinct social networks, or any sub-networks within a social network. Each individual or organization in a social network that is capable of accepting work will be referred to as a resource.

Figure 2:
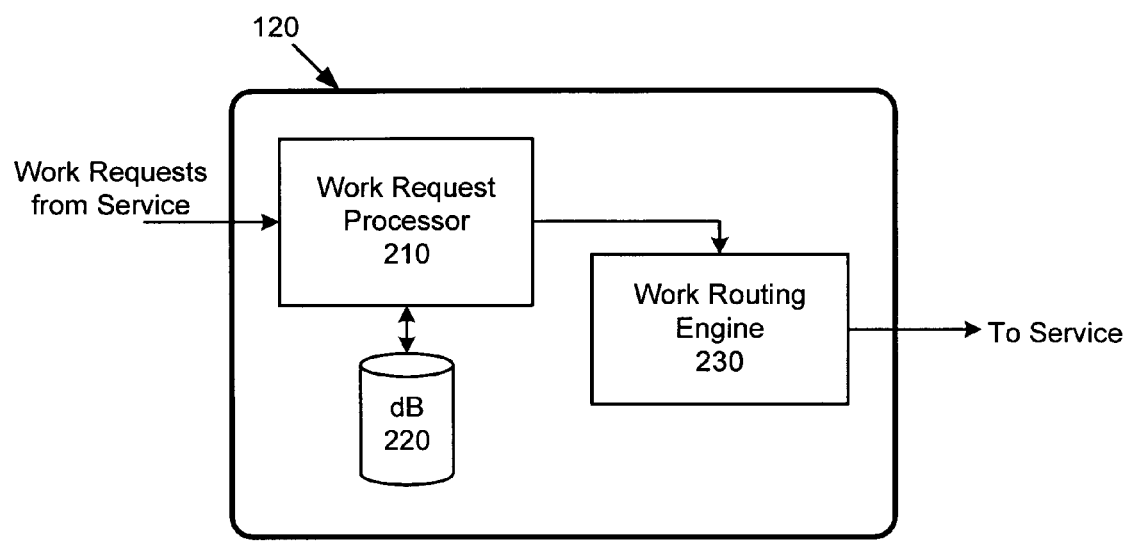
FIG. 2 illustrates an exemplary work-routing server in the exemplary system of FIG. 1.

The work-routing server 120 can reside in a single computing device or multiple computing devices connected via or distributed over a network. FIG. 2 illustrates an exemplary work-routing server 120. The exemplary work-routing server 120 includes a work request processor 210, a database 220, and a work routing engine 230. In an exemplary implementation, the work request processor 210 receives work requests from the service 110. The work request processor 210 parses each received work request to determine the type of work and any other metadata associated with the work. For example, a service 110 may request to have a resource transcribe a digital recording of a medical conference regarding infectious diseases. In this case, the work request processor 210 determines that the work type is recording transcription and the recording is related to infectious diseases.

The database 220 includes information related to resources in one or more social networks 130. For example, the database 220 includes information regarding the attributes, interests, availability, membership to any communities within the network, past performance records, and/or any other information related to each resource. In an exemplary implementation, the database 220 also includes work routing plans. A work routing plan is a plan for routing work to specific or groups of resources. Work routing plans can be service specific, work type specific, metadata content specific, any combination thereof, or otherwise customizable depending on design choice. For example, a request from a pizza delivery service for a resource to answer a sales call may involve a different work routing plan than a request from a translation service seeking a language translator. The database 220 may reside within the work-routing server 120 or may be remote from, but accessible to, the work-routing server 120.

In the exemplary embodiment illustrated in FIG. 2, the work request processor 210 accesses the database 220 to determine which resource is optimally suited to handle the work related to the work request. In an exemplary implementation, the work request processor 210 consults a work routing plan applicable to the instant work request to determine a hierarchy of preferred resources, if any, for handling the work. For example, the work routing plan for recording transcription of a medical conference regarding infectious diseases may specify that the work should first be routed to any available resource having had transcription experience. Secondly, if more than one experienced resources are available, then route to someone with medicine related interest or experience. Thirdly, if more than one transcription and medically experienced resources are available, route to the resource having infectious disease related interest or experience, and so forth.

After determining an optimal resource for handling a work request, the work request processor 210 may instruct the work routing engine 230 to route the work request to the selected resource. In another exemplary implementation, the work routing engine 230 may inform the service 110 of the identity of the resource. In this implementation, the service 110 may directly send the work to the selected resource or may route the work to the selected resource via another device (e.g., the work-routing server 120).

Figure 3:
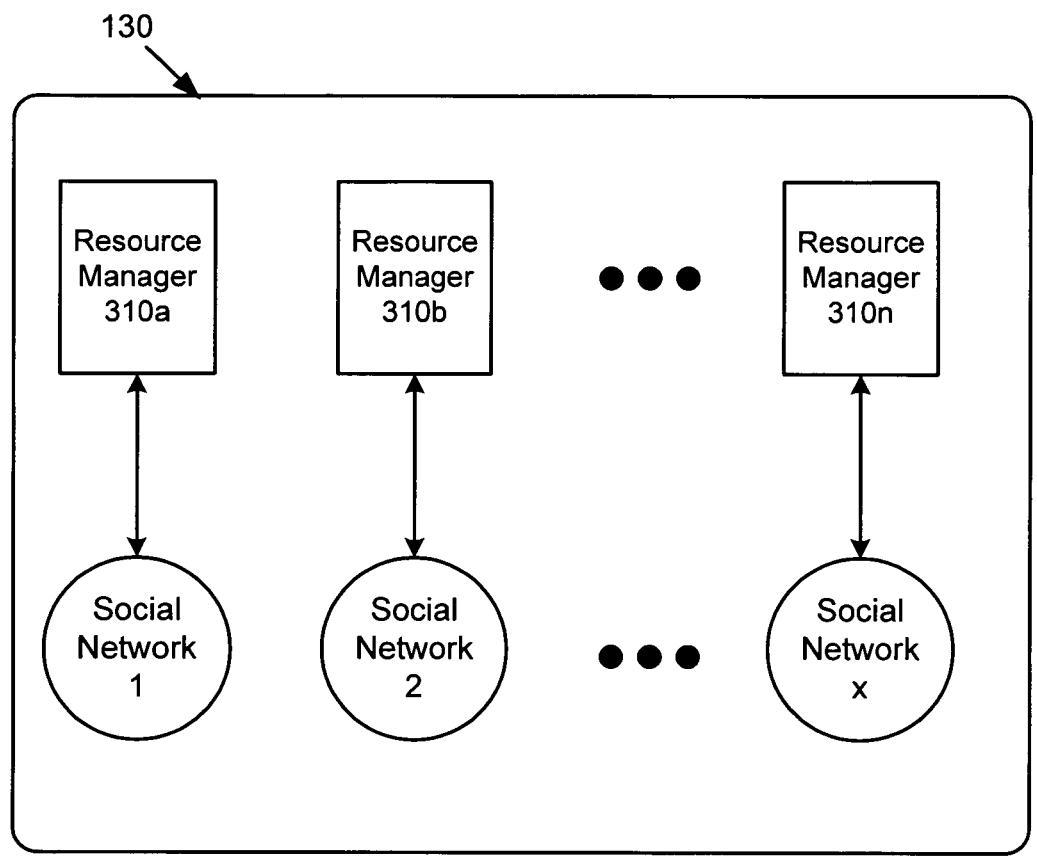
FIG. 3 illustrates an exemplary social network in the exemplary system of FIG. 1.

FIG. 3 illustrates an exemplary social network 130. The exemplary social network 130 includes a plurality of resource managers 310a-310n managing a plurality of social networks (i.e., network 1 to network x). Each resource manager maintains a database of resources of its corresponding social network. In another exemplary implementation, each resource manager 310 may manage multiple social networks. Alternatively, each social network may be managed by multiple resource managers 310. In an exemplary implementation, upon receipt of a request for a resource from a work-routing server 120, each resource manager 310 reviews its database of resources from the social network (or social networks) it manages and selects one resource optimally suited to handle the work (e.g., the resource possessing the most of relevant capabilities related to the work). As a result, the work-routing server 120 may receive the identities of a plurality of potential resources, one from each resource manager 310. At the work-routing server 120, the work request processor 210 selects one resource among the plurality of potential resources suggested by the resource managers 310. In an exemplary implementation, the one resource may be selected based on an applicable work routing plan. In another exemplary implementation, the one resource may be selected based on relevant capabilities determined based at least on the type of work and/or information contained in the metadata of the work request.

III. Exemplary Processes for Routing Work to Resources in a Social Network

Figure 4:
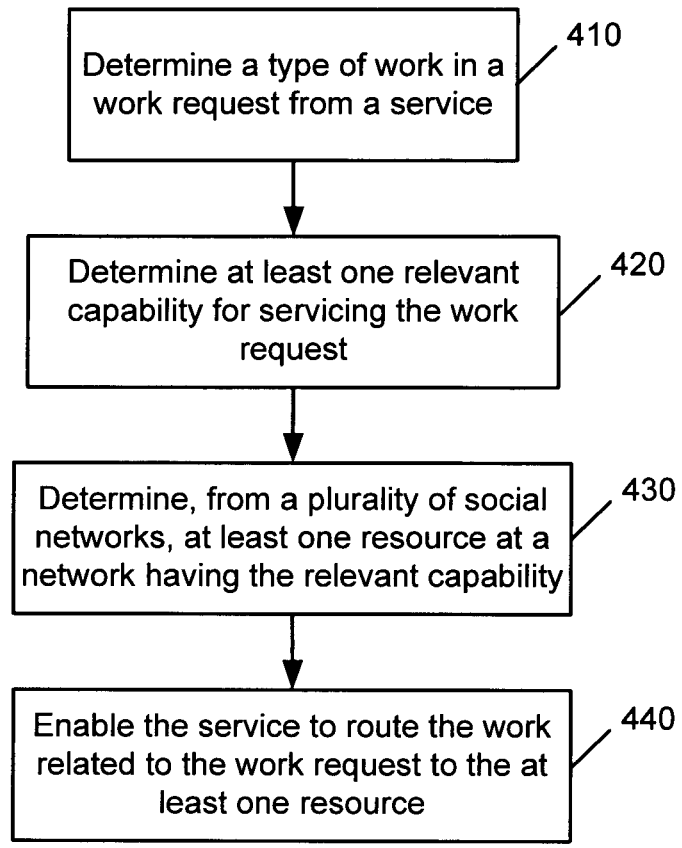
FIG. 4 illustrates an exemplary process performed by an exemplary work-routing server to route work to a resource in a social network.

FIG. 4 illustrates an exemplary process for routing work to resources in a social network. This exemplary process is performed by the work-routing server 120.

At step 410, the work-routing server 120 determines a type of work involved in a work request received from a service 110.

At step 420, the work-routing server 120 determines at least one relevant capability for servicing the work request. In an exemplary implementation, the work-routing server 120 determines the relevant capabilities based on one or more of the work type, any metadata associated with the work request, and/or an applicable work routing plan. For example, if the work is to transcribe a digital recording of a medical conference regarding infectious diseases, the work-routing server 120 may determine that relevant capabilities may include one or more of: experience with recording transcription, medical experience, infectious disease interest, and so forth. In an exemplary implementation, relevant capabilities can be categorized based on different communities that have been self-organized in the social network 130. For example, if the social network has not been self-organized to include an infectious disease community, then that particular capability will not be used as a relevant capability for servicing the work request. The work-routing server 120 may access a database 220 for determining the availability and types of communities in a social network, and/or retrieving work routing plans.

At step 430, the work-routing server 120 determines, from a plurality of social networks, at least one resource at a network having at least one relevant capability. In an exemplary implementation, the work-routing server 120 may send a resource request to a plurality of resource managers 310. If multiple resources are available and suitable for handling the work, the work-routing server 120 may select one of the resources.

At step 440, the work-routing server 120 enables the routing of the work related to the work request to the at least one resource. In an exemplary implementation, the work-routing server 120 sends the identity of the selected resource to the service 110 to enable the service 110 to route the work to the resource.

IV. An Exemplary Implementation

Figure 5:
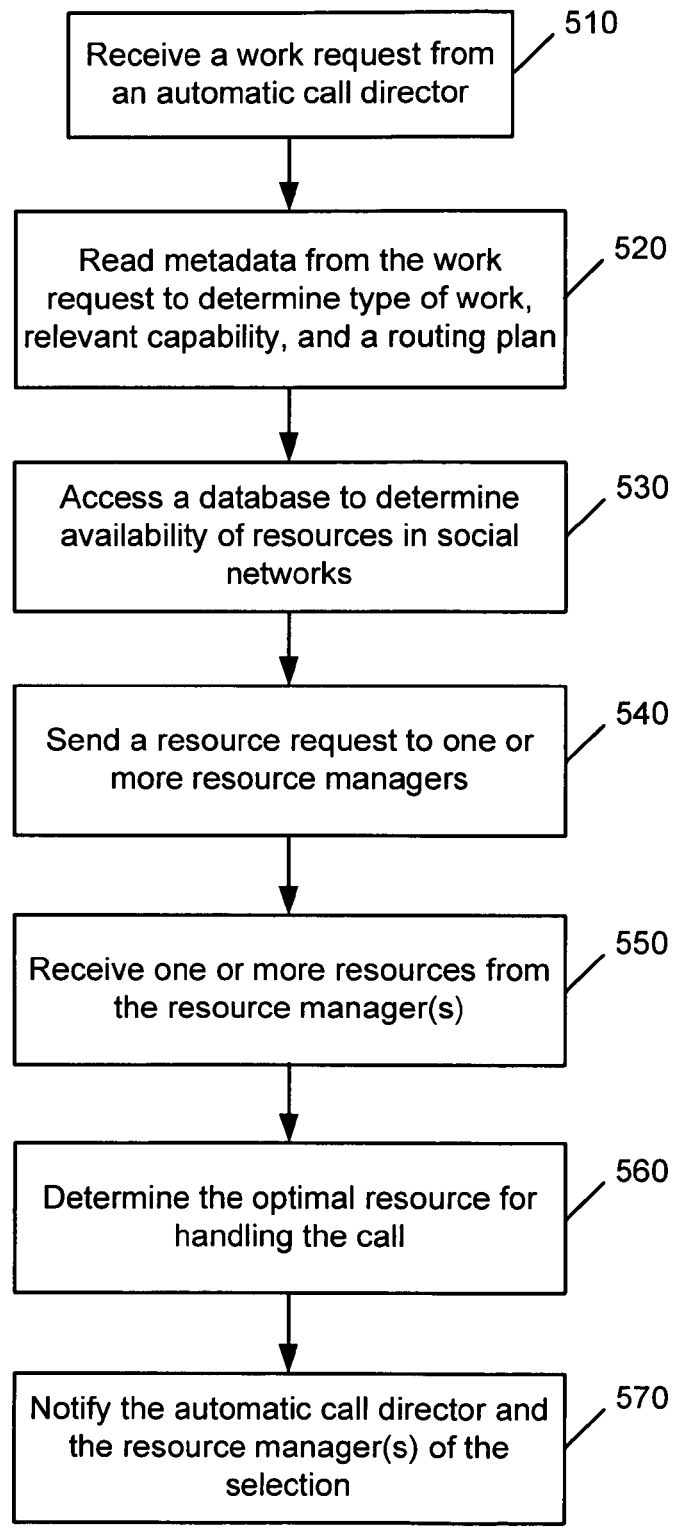
FIG. 5 illustrates an exemplary process of an exemplary implementation of work routing in a call center scenario.

FIG. 5 illustrates an exemplary process for routing work to a web-based social network in a call center environment. In a typical call center environment, callers place calls seeking products and/or services. For example, callers may call to place an order, to seek technical support, to seek customer support, and so forth. The calls may be received by automated agents such as interactive voice response units (IVRs) or by human agents. Calls received at the call center are generally directed by an automatic call director to appropriate resources for handling the calls.

At step 510, a work-routing server 120 receives a work request from an automatic call director for a resource to handle an in-coming call.

At step 520, the work-routing server 120 reads metadata from the work request to determine the type of work, relevant capabilities, and one or more routing plans. For example, the metadata may include the phone number dialed by the caller which may indicate the appropriate call routing plan for that phone number. Depending on the subject matter of the call, the work-routing server 120 can determine any relevant capabilities. For example, if the caller is calling to place an order for cookware, a relevant capability may be an agent who enjoys cooking. The appropriate call routing plan may indicate that the call coming in from the phone number 123-4567 should be routed to an agent in the west coast.

At step 530, the work-routing server 120 accesses a database to determine availability of resources in a social network. For example, the work-routing server 120 may determine whether there is a community in the social network for people who enjoys cooking. If so, the work-routing server 120 may determine if anyone within the community is currently available to handle the call.

At step 540, the work-routing server 120 sends a resource request to one or more resource managers managing the social network. In an exemplary implementation, each resource manager 310 manages a subset of all available resources in a social network.

At step 550, the work-routing server 120 receives one or more identities of resources from the resource managers 310. In an exemplary implementation, each resource manager 310 responds to the resource request with the identity of one resource.

At step 560, the work-routing server 120 determines the optimal resource for servicing the work. For example, the work-routing server 120 may consult the applicable work routing plan for each work request when determining an optimal resource.

At step 570, the work-routing server 120 notifies the service 110 and the resource managers 310 about the selection and enables the service 110 to route work to the selected resource. As result, an agent in the social network is selected to handle the call and the automatic call director connects the call to the agent.

The exemplary implementations described above are merely illustrative. One skilled in the art will recognize that other implementations are possible for routing any type of work to resources at a self-organized social network.

V. Exemplary Operating Environments

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A computer-implemented method for routing work to resources in a web-based social network, comprising:
   (a) determining a type of work in a work request from a service;
   (b) determining at least one relevant capability for servicing said work request, said relevant capability being based on:
      (1) said type of work; and
      (2) at least one of an interest or a past performance record of available resources in the web-based social network;
   (c) determining, from said web-based social network, at least one resource having said relevant capability; and
   (d) enabling said service to route work related to said work request to said at least one resource.

2. The method of claim 1, wherein said work request is a digitized request including metadata describing work associated with the request.

3. The method of claim 1, wherein said capability includes human capabilities.

4. The method of claim 1, wherein said determining at least one resource includes determining availability of resources at each network in said plurality of networks.

5. The method of claim 1, wherein said determining at least one resource includes selecting one resource among a plurality of potential resources offered by said plurality of networks based on resource attributes.

6. The method of claim 1, wherein said determining at least one resource includes selecting one resource among a plurality of potential resources offered by said plurality of networks based on a routing plan.

7. The method of claim 6, wherein said routing plan is a predetermined plan.

8. The method of claim 1, wherein said enabling includes routing said work request to said at least one resource.

9. The method of claim 1, wherein said enabling includes routing work related to said work request to said at least one resource.

10. A system configured for routing work to resources in a social network, comprising:
    a work request processor configured to:
       determine a type of work in a work request from a service;
       determine at least one relevant capability for servicing said work request, said relevant capability being based on:
          (1) said type of work; and
          (2) at least one of an interest or a past performance record of available resources in the social network;
       determine, from the social network, at least one resource in the social network having said relevant capability; and
    a work routing engine configured to enable said service to route work related to said work request to said at least one resource.

11. The server of claim 10, wherein said work request is a digitized request including metadata describing work associated with said request.

12. The server of claim 10, wherein said work request processor is further configured to select one resource among a plurality of potential resources offered by said plurality of networks based on resource attributes.

13. The server of claim 10, wherein said work request processor is further configured to select one resource among a plurality of potential resources offered by said plurality of networks based on a routing plan.

14. The server of claim 10, wherein said work routing engine is further configured to route said work request to said at least one resource.

15. The server of claim 10, wherein said work routing engine is further configured to route said work related to said work request to said at least one resource.

16. A non-transitory computer-readable medium for routing work to resources in a social network, comprising logic instructions that, if executed:
    (a) determine a type of work in a work request from a service;
    (b) determine at least one relevant capability for servicing said work request, said relevant capability being based on:
       (1) said type of work; and
       (2) at least one of an interest or a past performance record of available resources in the social network;
    (c) determine, from the social network, at least one resource in the social network having said relevant capability; and
    (d) enable said service to route work related to said work request to said at least one resource.

17. The non-transitory computer-readable medium of claim 16, wherein said work request is a digitized request including metadata describing work associated with said request.

18. The non-transitory computer-readable medium of claim 16, wherein said logic instructions for determining at least one resource include instructions that, if executed, select one resource among a plurality of potential resources offered by said plurality of networks based on resource attributes.

19. The non-transitory computer-readable medium of claim 16, wherein said logic instructions for determining at least one resource include instructions that, if executed, select one resource among a plurality of potential resources offered by said plurality of networks based on a routing plan.

20. The non-transitory computer-readable medium of claim 16, wherein said logic instructions for enabling include instructions that, if executed, route said work request to said at least one resource.

21. The non-transitory computer-readable medium of claim 16, wherein said logic instructions for enabling include instructions that, if executed, route said work related to said work request to said at least one resource.

\* \* \* \* \*